United States Patent [19]

Curry

[11] Patent Number: 5,690,057
[45] Date of Patent: Nov. 25, 1997

[54] TOOTHLESS ELASTOMERIC SHEDDING BLADE

[75] Inventor: Jack B. Curry, Springtown, Tex.

[73] Assignee: JMK International, Inc., Weatherford, Tex.

[21] Appl. No.: 716,518

[22] Filed: Sep. 18, 1996

Related U.S. Application Data

[60] Provisional application No. 60/003,929, Sep. 18, 1995.

[51] Int. Cl.$^6$ ..................................................... A01K 13/00
[52] U.S. Cl. ............................................................ 119/623
[58] Field of Search ................................. 119/618, 620, 119/621, 622, 623

[56] References Cited

U.S. PATENT DOCUMENTS

| | | |
|---|---|---|
| 227,362 | 5/1880 | Judson. |
| 269,793 | 12/1882 | Keene. |
| 334,198 | 1/1886 | Sanford. |
| 1,141,917 | 6/1915 | Anderson. |
| 3,160,142 | 12/1964 | Torow ............................ 119/623 |
| 4,364,142 | 12/1982 | Pangle ............................ 119/623 |
| 5,042,512 | 8/1991 | Knight ............................ 132/212 |
| 5,261,426 | 11/1993 | Kellett et al. ................... 132/108 |

OTHER PUBLICATIONS

K.V. Vet Supply Co., Winter 1995 Catalog, pp. 133, 135 and 136.

*Primary Examiner*—Thomas Price
*Attorney, Agent, or Firm*—Jefferson Perkins

[57] ABSTRACT

A toothless elastomeric shedding blade (10) is capable of resiliently conforming to arcuate surfaces of a hair- or fur-bearing animal. The blade has two opposed blade portions (18,20) that form different angles of attack to the coat of the animal, and one of these angles of attack can be selected by the user for use. A combination of the resiliency of the shedding blade body, the acute angle of each blade portion and the coefficient of friction of the elastomeric material as applied to the coat of the animal produces a superior cleaning action.

21 Claims, 2 Drawing Sheets

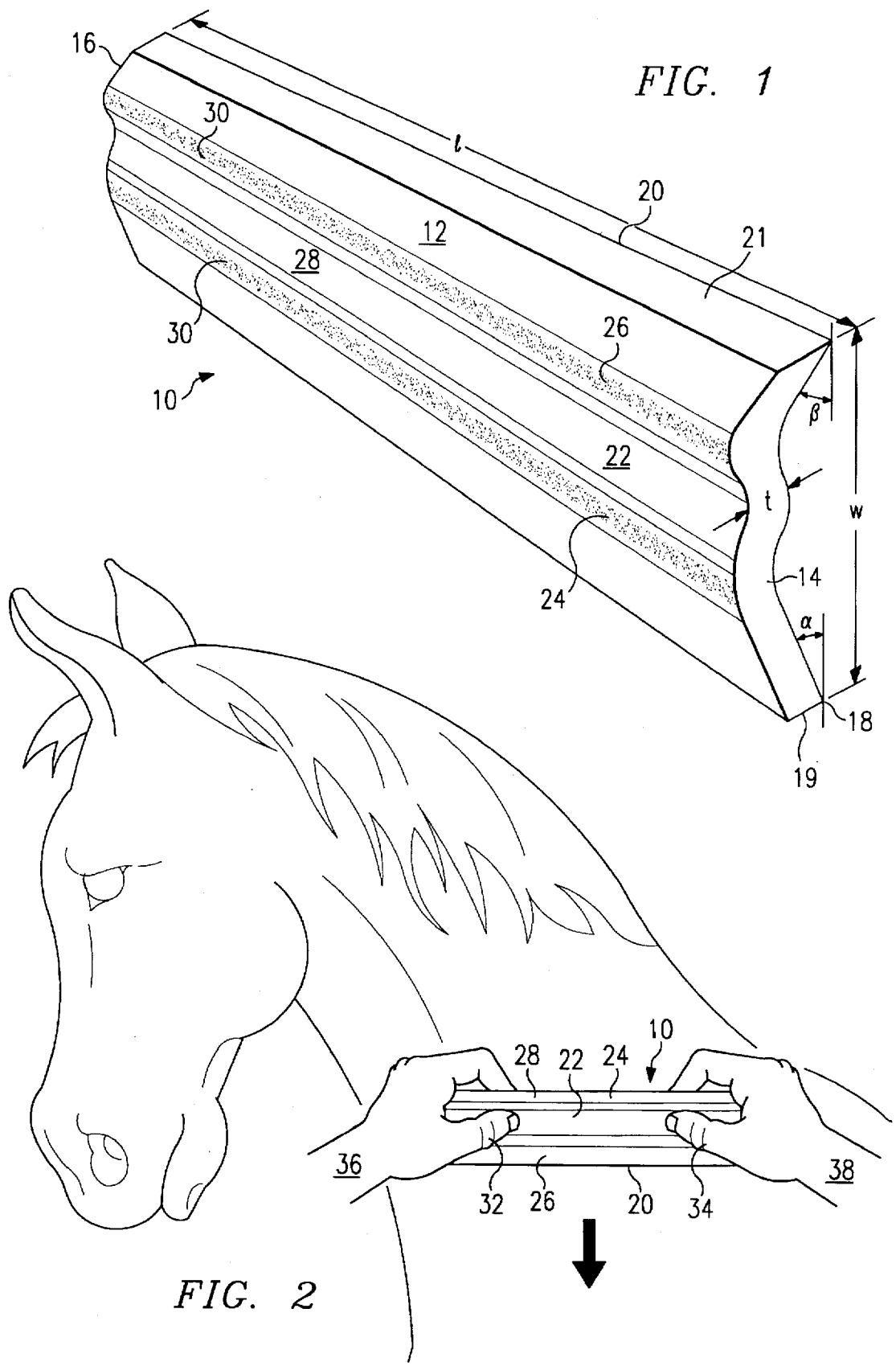

TOOTHLESS ELASTOMERIC SHEDDING BLADE

CROSS REFERENCE TO RELATED APPLICATIONS

This application claims the benefit of copending U.S. Provisional application Ser. No. 60/003,929 filed Sep. 18, 1995, owned by the assignee hereof.

TECHNICAL FIELD OF THE INVENTION

The present application relates generally to animal grooming aids, and more particularly to blades and combs to remove detritus from the coats of hair- or fur-bearing animals.

BACKGROUND OF THE INVENTION

Devices exist in the art for the removal of loose hair and other detritus from the coats of hair- and fur-bearing mammals, such as horses and dogs. A traditional device is a curry comb which is used on horses to remove hair after the winter coat has been shed. Brushes and the like are also well known in the art.

Some of these prior art devices have toothless or entire blades for application to the coat of the animal. Representative of these is U.S. Pat. No. 260,793 issued to Keene, which shows a curry comb having a straight blade and an opposed curved blade. While the rubber of the blade is made slightly flexible, a stiffening plate is added to the Keene structure, and a handle is fastened to it to stand perpendicular to the blade itself. U.S. Pat. No. 227,362 issued to Judson discloses a sweat-scraper with an entire margin that is formed of a hard, nonelastomeric rubber "or other suitable material." It is placed in hot water and heated sufficiently so that it can be given any desired form, curved or straight, to adapt it for use on any body part of the animal. The Judson apparatus does not disclose or suggest using the same device on different parts of the animal without first immersing the blade in hot water and conforming the blade to another shape. U.S. Pat. Nos. 334,198 issued to Sanford and 1,141,917 issued to Anderson disclose substantially rigid curved sweat scrapers for horses.

Despite the existence of these prior art devices, the conventional practice is to use a toothed curry comb on horses and the like in order to remove the winter coat of hair, or to remove accumulated dead hair, dandruff and dust prior to shows and the like. It has been discovered that even after the horse has been combed down with a conventional curry comb, not all of the loose hair is removed. The inventor has therefore developed a new device which removes dead hair and other detritus from an animal's coat more completely and which is capable of resiliently conforming to various animal body parts.

SUMMARY OF THE INVENTION

According to the invention, an elastomeric shedding blade is provided which is manufactured of a cured resilient elastomeric compound. The body of the shedding blade exhibits a modulus of elasticity of 200 to 900 psi at 100% elongation, and a durometer reading of 40 to 90 points on the Shore A Scale. The shedding blade is elongated and relatively flat, such that its length greatly exceeds its width, which in turn greatly exceeds its depth or thickness. At least one blade portion of the shedding blade extends along its length substantially between opposed ends and forms an acute angle in cross-section. The body is sufficiently resiliently elastic in the direction of its thickness that the blade portion can be manually conformed to an arcuate surface of an animal body part that has a diameter that is much smaller than the blade's length.

According to a further aspect of the invention, the elastomeric shedding blade has a first blade portion formed on its body that extends substantially between its ends, and a second blade portion formed on the body between its ends, wherein the width of the blade spaces the first blade portion from the second blade portion. The user selects one of these two blade portions and may manually conform the blade to an arcuate surface of the animal.

In a preferred embodiment, the shedding blade has a depression between the first and second blade portions as a stop for receiving at least one of the user's thumbs. It is also preferred that the two blade portions form different angles of attack as the shedding blade is applied to the animal coat, such that the user can select whichever angle is most effective for a given application.

The shedding blade according to the invention confers a principal technical advantage in that it may be manually conformed to any portion of an animal surface or coat. Because the blade is elastomerically resilient, the blade will spring back to an uncurved condition when it is not being applied to an arcuate skin or coat region. In this way, a single shedding blade can be used to cover all of the significant portions of a horse or other fur- or hair-bearing animal, thus giving a complete treatment to the animal in question. A further advantage of the invention inheres in its provision of two different shedding blade portions forming different angles of attack, such that the user can select between them.

The present invention has at least one, and preferably two, blade portions whose scraping action will bring up or disturb dead hair and which exhibit a coefficient of friction that is large enough to remove and carry along with them the loose hair and detritus. This combination of characteristics allows the blade to remove a considerable amount of loose hair and detritus from, e.g., a horse's coat even after the horse is been gone over thoroughly with a curry comb. The result is a more thorough cleaning of the animal's coat.

BRIEF DESCRIPTION OF THE DRAWINGS

Further aspects of the invention and there advantages may be discerned with reference to the following detailed description when taken in conjunction with the drawings, in which:

FIG. 1 is an isometric view of a shedding blade according to the invention;

FIG. 2 is an elevational view showing how the shedding blade of the invention is grasped by the hands of the user and applied to an animal, and particularly illustrating the registry of the user's thumbs within an elongated depression formed by the shedding blade;

DETAILED DESCRIPTION OF ILLUSTRATED EMBODIMENT

Figure 3:
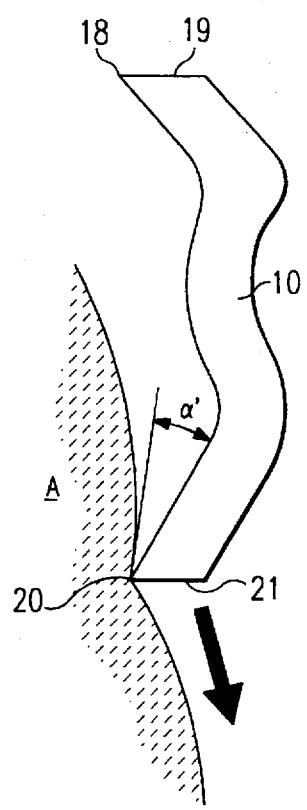
FIG. 3 is an end view of the shedding blade showing its application to the coat of an animal.

Referring first to FIG. 1, an elastomeric toothless shedding blade, indicated generally at 10, has a length l, a width w and a thickness t. The shedding blade 10 is elongated and relatively flat, such that the length l is many times its width w, which in turn is many times its maximum thickness t; the length l is thus at least an order of magnitude greater than thickness t. In a preferred embodiment, length l is 6", width w is 2" and thickness t is approximately 0.25". The thickness t is substantially uniform throughout the width of the shedding blade. The shedding blade 10 is formed of a resilient elastomer which can be any of a number of different materials, examples of which will be discussed below. The elastomer should be sufficiently flexible and thickness t chosen such that it can be bent in the direction of thickness t to at least a "U" shape, but its resilience and width w should be chosen such that the body 12 is sufficiently stiff in the direction of its width w that a significant resistance will be developed when the shedding blade is pulled across an animal's coat without the blade buckling under. As applied to an animal's coat in a dry state, the material should exhibit a coefficient of friction in the range of 0.25 to 0.75 g/g weight. Preferably, the coefficient of friction should be selected such that loose hair or detritus will be pulled out of the animal's coat, but such that live (or attached) hair will not be removed, and such that the animal will not experience undue discomfort. Its durometer range should fall within 40 to 90 points on the Shore A Scale, and preferably from 60 to 80 points.

Shedding blade 10 can be formed of any of a number of different elastomers exhibiting the above properties, including isoprene rubber, silicone rubber, marprene, chlorinated polyethylene, HYTREL (a trademarked material of DuPont), SANTOPRENE (a trademarked material of Monsanto), polyacrylate, ethyleneacrylates, low density polyethylene, nitrile butyl rubber (NBR), ethylene diene monomer (EPDM), chloroprene, styrene butadiene rubber (SBR), polyurethane, polybutadiene or natural rubber.

A particularly preferred composition is silicone rubber, because of its enhanced durability and resistance to attack from chemicals, ozone and ultraviolet light. This resistance to attack will preserve the blade's resilience and the sharpness of the shedding blade portions presented to the animal's coat.

A silicone compound useful in forming a shedding blade body according to the invention includes about 100 parts by weight of a vulcanizable silicone polymer elastomer and about 40 to 220 parts by weight of an inert filler, such as a siliceous, calcareous or other mineral filler. The elastomer has at least one long-chain polydiorganosiloxane gum with organo side groups consisting of between 0.02 and 1.00% vinyl and the remainder methyl, and an average molecular weight on the order of one million. In a particularly preferred composition, the elastomer includes a major portion of a long-chain dimethylvinylsiloxy-ended polydiorganosiloxane, with the organo side groups thereof consisting of 0.1 to 0.3 wt. percent vinyl and the remainder methyl, and a minor portion of a long-chain dimethylvinylsiloxy-ended polydimethylsiloxane.

A silicone composition used to form the shedding blade of the invention should also have between 3 and 60 parts by weight of a reinforcing filler, and preferably 30–50 parts by weight, which can be small siliceous particles having a particle size of less than or equal to 5 microns. A reinforcing filler can be chosen from the group consisting of fumed silica, precipitated silica and mixtures thereof. Where precipitated silica is used instead of fumed silica, about 10% more should be used in comparison to a fumed silica level.

The remainder of the filler can be a non-reinforcing filler of larger siliceous, calcareous or other particles in the range of 5 to 100 microns, chosen from the group consisting of ground quartz, chalk, celite, iron oxide or other inert fillers.

In a particularly preferred embodiment, 45 parts by weight of a fumed silica are used in combination with 100 parts by weight of a nonreinforcing filler. One conventional method of measuring the amount of filler is its specific gravity. The specific gravity of a silicone rubber composition climbs as more siliceous or calcareous filler is added because these substances are heavier than the largely polydiorganosiloxane elastomer gum in which they are immersed.

The composition also preferably has a process aid, which can be a third silicone polymer having a weight average molecular weight between 1000 and 10,000 and a viscosity of between 5 and 100 centistokes. The ratio by weight of this process aid to the reinforcing filler should be in the range of 3 to 1 to 12 to 1, and preferably is approximately 6 to 1. The addition of this process aid prevents crepe hardening. A silicone composition useful for forming the shedding blade 10 will also include minor constituents such as silane, a cerium stabilizer such as cerium octoate, an anti-acid additive, a vulcanization catalyst such as 2,4-dichlorobenzoyl peroxide, dicumyl peroxide or one of the platinum catalysts, and pigment as desired.

Returning to FIG. 1, the blade 10 has a body 12 that extends between opposed ends 14 and 16 in the direction of length l. The body 12 has a first blade portion 18 that run along the direction of length l between ends 14 and 16, and an opposed blade portion 20 that likewise extends between ends 14 and 16 and is opposed to blade portion 18, being separated by the width of the body 12. Blade portions 18 and 20 are formed such that an acute angle of material, in the range of 10° to 90°, is presented to the animal's coat. Preferably, the body 12 is so formed that the blade portions 18 and 20 present different angles of attack α and β. In a preferred embodiment, angle α is approximately 45°, while angle β is approximately 30°. Angles of attack α and β are intentionally chosen to be different from each other to provide the user a choice in which blade to use in grooming the animal. Blade portion 20 has a leading surface 21 which is substantially parallel to the direction of thickness t, or substantially normal to dimensions l and w. Blade portion 18 has a similar leading surface 19 (see FIGS. 3 and 4).

Intermediate blade portions 18 and 20 is an elongate depression 22 that is formed between two elongated spaced ridges 24 and 26 that preferably are parallel to each other. The depression 22 is formed to receive at least one, and preferably both, of the user's thumbs, as will be discussed in conjunction with FIG. 2. Portions of an upper surface 28 of the body 12 may have an appropriate texturing pattern 30 applied to it as a gripping aid; in the illustrated embodiment, these texturing patterns 30 are applied to ridges 24 and 26.

The shedding blade 10 can be conveniently manufactured by extruding an uncured compound through an extruder having a die that matches the cross-section of the shedding blade, cutting the extruded shedding blade to the desired length l, and then curing the blade by application of heat. The texturing 30 can be added to the extruded workpiece after extrusion but before curing.

Turning now to FIG. 2, the preferred manner of grasping the shedding blade 10 is shown. In the illustrated instance, the user has selected shedding blade 20 for application to the animal. The blade portion 20 is arranged so as to be the leading edge in the direction of movement of the shedding blade 10, in this instance downward as indicated by the arrow. The top surface 28 is held toward the user and away from the animal to be groomed. At least one, and preferably both, of the user's thumbs 32 and 34 are placed within the receiving depression 22, while the fingers of the user's hands 36 and 38 grasp the rear surface (not shown) of the shedding blade 10. The blade is then pulled downward along the coat of the animal. The depression 22 acts as a stop against which the thumbs can act to transmit force. The combination of the use of the selected acute blade portion in disturbing or bringing up dust, detritus and hair, and the ability of the blade to draw along with it such dust, detritus and dead hair because of its high coefficient of friction, produces a superior cleaning action.

Figure 4:
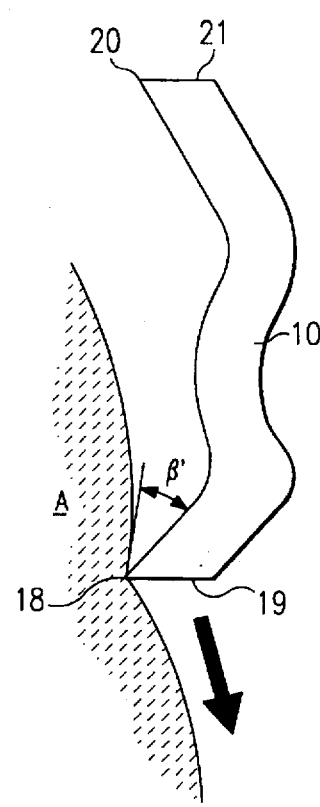
FIG. 4 is a similar end view of the shedding blade according to the invention, showing the use of the blade portion opposed to the blade portion shown in FIG. 3.

FIGS. 3 and 4 are elevational views of the blade 10 being applied to the coat of an animal A. In FIG. 3, the blade portion 20 has been selected for contact to the surface of the animal. Blade portion 20 forms a more acute angle $\alpha'$ with the skin of the animal A than would be the case for the blade portion 18. In FIG. 4, blade portion 18 has been selected and, given an approximately similar angling of the entire blade 10 to the surface of the animal A, will have an angle of attack $\beta'$ which is greater than $\alpha'$ (FIG. 3). In use, the entire body 12 of the blade 10 is held out at an acute angle to the surface of the animal A.

Figure 5:
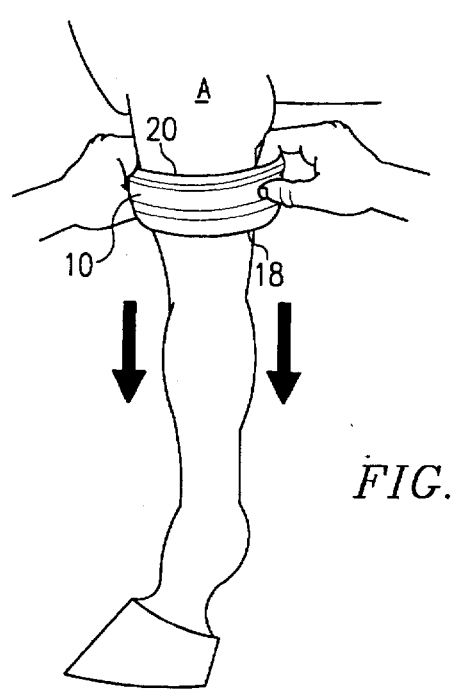
FIG. 5 is an elevational view showing the conformance of the blade to a relatively small body part of the animal to be treated.

FIG. 5 shows the application of the blade 10 around an arcuate surface of animal A, such as the animal's leg. The blade 10 can be conformed to a feature of the animal having a diameter which is far less than the length l of the blade, thus allowing the cleaning of the animal's coat on highly curved surfaces of the animal A. The blade 10 is curved around the surface of the animal A through the use of the user's hands; after pressure from the hands has been released, the blade 10 returns to its normal straight shape. The blade 10 is thus capable of conforming to all portions of the animal requiring grooming.

In summary, a toothless elastomeric shedding blade has been provided which is capable of resiliently conforming to arcuate surfaces of hair- or fur-bearing animals. The blade features two blade portions forming different angles of attack to the animal, such that the user can select between them.

While an illustrated embodiment of the invention has been described in the above detailed description and illustrated in the accompanying drawings, the invention is not limited thereto but only by the scope and spirit of the appended claims.

I claim:

1. An elastomeric shedding blade, comprising:
   a body consisting of a cured resilient elastomeric compound, said body exhibiting a modulus of elasticity of 200 to 900 and a durometer reading of 40 to 90 points on a Shore A Scale;
   a maximum thickness of said body defined in a first direction, a width of said body in a second direction normal to said first direction and being a multiple of said depth, a length of said body in a third direction normal to said first and second directions and being a multiple of said width, said length taken between two opposed ends; and
   at least one blade portion extending substantially between said ends forming an acute angle, said body being sufficiently resiliently elastic in said first direction so that said blade portion can be manually conformed to an arcuate surface of an animal body part having a diameter much less than said length.

2. The shedding blade of claim 1, wherein said blade portion has a leading surface substantially in parallel with said first direction.

3. The shedding blade of claim 1, wherein said body has a top surface extending in said second and third directions, a depression formed in said top surface as a stop for at least one of a user's thumbs.

4. The shedding blade of claim 1, wherein said body is of uniform cross-section in any plane formed parallel to said first and second directions.

5. The shedding blade of claim 1, wherein said body is made from a silicone rubber composition.

6. The shedding blade of claim 5, wherein said silicone rubber composition further comprises 100 parts by weight of a vulcanizable silicone polymer elastomer and about 40 to 220 parts by weight of an inert filler.

7. The shedding blade of claim 6, wherein said silicone rubber composition is between 3 and 60 parts weight of a reinforcing filler.

8. The shedding blade of claim 6, wherein said silicone rubber composition further comprises a non-reinforcing filler of larger siliceous, calcareous or other particles in the range of 5 to 100 microns.

9. The shedding blade of claim 6, wherein said silicone rubber composition has a process aid comprising a silicone polymer having an average molecular weight between 1,000 and 10,000 and a viscosity between 5 and 100 centistokes.

10. The shedding blade of claim 9, wherein the ratio by weight of said process aid to said reinforcing filler is in the range of 3 to 1 to 12 to 1.

11. The shedding blade of claim 1, wherein said body has a durometer reading from 60 to 90 points on the Shore A Scale.

12. The shedding blade of claim 1, wherein said body has said length of 6 inches, said width of 2 inches and said thickness of 0.25 inches.

13. The shedding blade of claim 1, wherein said body has an upper surface that is textured as a gripping aid.

14. An elastomeric shedding blade for removing loose hair and detritus from an animal coat comprising:
   a body formed of a resilient cured elastomeric compound having a coefficient of friction with respect to said animal coat in the range of 0.25 to 0.75 g/g weight when said animal coat is dry;
   a thickness of said body defined in a first direction, a width of said body in a second direction normal to said first direction being a multiple of said thickness, a length of said body in a third direction normal to said first and second directions being a multiple of said width, said length extending between two opposed ends of said body;
   a first blade portion formed on said body to form an angle less than or equal to 90° and extending substantially between said ends; and
   a second blade portion formed on said body to form an angle of less than or equal to 90° in a plane parallel to said thickness and extending substantially between said ends, said width spacing said first blade from said second blade, a user-selected one of said blades being manually conformable to said animal coat.

15. The shedding blade of claim 14, wherein an angle of attack of said first blade portion as applied to the animal coat is substantially different from an angle of attack of said second blade portion when applied to said animal coat in the same manner.

16. The shedding blade of claim 14, wherein said angle of attack of said first blade portion is 45 degrees.

17. The shedding blade of claim 14, wherein said angle of attack of said second blade portion is 30 degrees.

18. The shedding blade of claim 14, wherein each said blade portion has a leading surface substantially in parallel with said first direction.

19. The shedding blade of claim 14, wherein said body has a top surface extending between said first and second blade portions, a depression formed in said top surface as a stop for at least one of the user's thumbs.

20. The shedding blade of claim 14, wherein said body has an upper surface that is textured as a gripping aid.

21. A method for removing loose hair and detritus from an animal's coat, comprising the steps of:

forming a shedding blade of a resilient elastomeric compound to have a coefficient of friction with respect to the animal's coat in a dry state of 0.25 to 0.75 g/g wt., and having a length which is at least an order of magnitude greater than a thickness thereof;

grasping the shedding blade with at least one hand such that the user's thumb is fitted into a depression formed in an outer surface of the shedding blade;

conforming a blade portion of the shedding blade to an area of the animal's coat having an arcuate profile; and drawing the blade portion along the animal's coat to remove loose hair and detritus.

* * * * *